US011691779B2

(12) United States Patent
Hengami (10) Patent No.: US 11,691,779 B2
(45) Date of Patent: *Jul. 4, 2023

(54) FOLDING BOX WITH INTEGRAL PRODUCT HOLDER

(71) Applicant: David T. Hengami, Torrance, CA (US)

(72) Inventor: David T. Hengami, Torrance, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/521,743

(22) Filed: Nov. 8, 2021

(65) Prior Publication Data

US 2022/0063862 A1    Mar. 3, 2022

Related U.S. Application Data

(63) Continuation of application No. 16/053,766, filed on Aug. 2, 2018, now Pat. No. 11,186,405.

(Continued)

(51) Int. Cl.
*B65D 85/68* (2006.01)
*B65D 5/50* (2006.01)
(Continued)

(52) U.S. Cl.
CPC .......... *B65D 5/5011* (2013.01); *B65D 5/0254* (2013.01); *B65D 5/5014* (2013.01);
(Continued)

(58) Field of Classification Search
CPC ............... B65D 5/5011; B65D 5/0254; B65D 5/5014; B65D 5/6608; B65D 85/68; B65D 2585/6882; B65D 5/4279; B31B 2241/00

(Continued)

(56) References Cited

U.S. PATENT DOCUMENTS

| 958,707 A | 5/1910 | Stafford |
| 1,543,953 A | 6/1925 | Rothschild |

(Continued)

FOREIGN PATENT DOCUMENTS

| CN | 204399639 | 12/2014 |
| DE | 10044018 A1 | 9/2000 |

(Continued)

OTHER PUBLICATIONS

Https://issuu.com/designpackaging/docs/packaging-dielines-free-book-design—Packaging & Dielines: The Designer's Book of Packaging Dieline; published at least as early as Aug. 1, 2018; 2 pages.

(Continued)

*Primary Examiner* — J. Gregory Pickett
*Assistant Examiner* — Jenine Pagan
(74) *Attorney, Agent, or Firm* — Concourse Law Group; Katherine B. Sales, Esq.

(57) ABSTRACT

A single blank for forming a box, the blank comprising a first panel, a second panel, a third panel and a fourth panel. The first panel is foldably connected to a folding support structure that is foldable and insertable inside the box. The folding support structure comprises a first inner flap which is connected to the first panel along a first inner flap fold line, a second inner flap which is connected to the first inner flap along a first inner flap second fold line, a first integral holding panel which is connected to the second inner flap along a first edge fold line, and a second integral holding panel which is foldably connected to the first integral holding panel along a second integral holding panel fold line.

15 Claims, 4 Drawing Sheets

Related U.S. Application Data (60) Provisional application No. 62/540,507, filed on Aug. 2, 2017.

(51) Int. Cl.
    *B65D 5/02*        (2006.01)
    *B65D 5/66*        (2006.01)

(52) U.S. Cl.
    CPC ........... *B65D 5/6608* (2013.01); *B65D 85/68* (2013.01); *B31B 2241/00* (2013.01); *B65D 2585/6882* (2013.01)

(58) Field of Classification Search
    USPC ....................................................... 206/335
    See application file for complete search history.

(56) References Cited

U.S. PATENT DOCUMENTS

| | | |
|---|---|---|
| 1,951,274 A | 3/1934 | Denman |
| 2,000,210 A | 5/1935 | Bayless |
| 2,330,926 A | 10/1943 | Rous |
| 2,342,081 A | 2/1944 | Kirkland et al. |
| 2,507,430 A | 5/1950 | Yancey |
| 2,857,881 A | 10/1958 | Beebe |
| 2,903,175 A | 9/1959 | Peimer |
| 2,950,851 A | 8/1960 | Peimer |
| 2,983,421 A | 5/1961 | Turpin |
| 3,009,565 A | 11/1961 | Leone |
| 3,016,178 A | 1/1962 | Knocks |
| 3,033,436 A | 5/1962 | Peimer |
| 3,040,953 A | 6/1962 | Tindall |
| 3,079,062 A | 2/1963 | Craddock |
| 3,082,929 A | 3/1963 | Aquino et al. |
| 3,115,290 A | 12/1963 | Byassee |
| 3,126,141 A | 3/1964 | Walter |
| 3,229,888 A | 1/1966 | Gillam |
| 3,438,482 A | 4/1969 | Hamilton |
| 3,441,125 A | 4/1969 | Small |
| 3,539,089 A | 11/1970 | Osberg |
| 3,610,510 A | 10/1971 | Lowry |
| 3,669,336 A | 6/1972 | Robinson |
| 3,819,093 A | 6/1974 | Forbes |
| 3,907,108 A * | 9/1975 | Weimer, Jr. ........... B65D 5/5021 229/120.08 |
| 4,054,203 A * | 10/1977 | Farquhar .............. B65D 5/5014 206/277 |
| 4,063,679 A | 12/1977 | Henry |
| 4,081,128 A | 3/1978 | O'Neill |
| 4,094,456 A | 6/1978 | Raccaforte |
| 4,141,485 A | 2/1979 | Lambert |
| 4,197,985 A | 4/1980 | Austin |
| 4,201,329 A | 5/1980 | Roccaforte |
| 4,274,578 A | 6/1981 | Montealegre |
| 4,349,105 A | 9/1982 | Bradley et al. |
| 4,361,270 A | 11/1982 | Roccaforte |
| 4,438,848 A | 3/1984 | Montealegre et al. |
| 4,452,355 A | 6/1984 | Benham |
| 4,609,142 A | 9/1986 | Adamek |
| 5,040,721 A | 8/1991 | Essack |
| D319,976 S | 9/1991 | Wortley et al. |
| D320,935 S | 10/1991 | Nylander |
| 5,056,708 A | 10/1991 | Boyle et al. |
| 5,135,158 A | 8/1992 | Boyle et al. |
| 5,145,070 A | 9/1992 | Pallett et al. |
| 5,197,625 A | 3/1993 | Mullaney |
| 5,348,219 A | 9/1994 | Brintazzol |
| D361,262 S | 8/1995 | Lusker |
| 5,465,834 A | 11/1995 | Sieber et al. |
| 5,505,370 A | 4/1996 | Brown et al. |
| 5,505,373 A | 4/1996 | von Stillfried |
| 5,540,330 A | 7/1996 | Lo Duca |
| 5,607,058 A | 3/1997 | Huesman et al. |
| D390,330 S | 2/1998 | Skaya |
| 5,725,620 A | 3/1998 | Perea et al. |
| 5,845,424 A | 12/1998 | Mitchell |
| 5,918,799 A | 7/1999 | Walsh |
| 5,927,498 A | 7/1999 | Saam |
| D425,413 S | 5/2000 | Heeley et al. |
| 6,079,563 A | 6/2000 | Katchmazenski |
| 6,116,499 A | 9/2000 | Hengami |
| 6,227,440 B1 | 5/2001 | Hart |
| 6,273,332 B1 | 8/2001 | Hengami |
| 6,360,942 B2 | 3/2002 | Hengami |
| D455,455 S | 4/2002 | Katsuyama |
| 6,393,707 B1 | 5/2002 | Maffei |
| 6,394,275 B1 | 5/2002 | Paliotta et al. |
| 6,435,402 B1 | 8/2002 | Hengami |
| 6,474,040 B1 | 11/2002 | Ours et al. |
| 6,637,646 B1 | 10/2003 | Muise et al. |
| 6,691,869 B2 | 2/2004 | Knaack et al. |
| 6,733,555 B1 | 5/2004 | Wilder |
| 6,889,892 B2 | 5/2005 | Walsh et al. |
| D508,850 S | 8/2005 | Ghini et al. |
| 6,945,449 B2 | 9/2005 | Hengami |
| 6,971,524 B1 | 12/2005 | Voswinkel |
| 7,040,528 B2 | 5/2006 | Hengami |
| 7,097,043 B2 | 8/2006 | Hsu |
| 7,156,286 B2 | 1/2007 | Hengami |
| D551,967 S | 10/2007 | Hengami |
| D552,987 S | 10/2007 | Magnusson |
| 7,337,904 B2 | 3/2008 | Hengami |
| D580,754 S | 11/2008 | Suwon-Si |
| 7,494,044 B2 | 2/2009 | Walsh et al. |
| 7,503,475 B2 | 3/2009 | McGowan |
| D594,743 S | 6/2009 | Lukka |
| 7,661,578 B2 | 2/2010 | Li |
| 7,743,973 B2 | 6/2010 | Hengami |
| 7,992,764 B2 | 8/2011 | Magnusson |
| 8,261,964 B2 | 9/2012 | Raupach et al. |
| 8,499,999 B2 | 8/2013 | Sieber et al. |
| 8,739,969 B2 | 6/2014 | Schuld |
| 8,800,855 B2 | 8/2014 | Fitzwater |
| 8,844,797 B2 | 9/2014 | Smith |
| 9,085,386 B2 | 7/2015 | Hengami |
| 9,394,066 B2 | 7/2016 | Hengami |
| 9,394,076 B2 | 7/2016 | Hengami |
| 9,561,878 B2 | 2/2017 | Lee |
| 9,643,749 B2 | 5/2017 | Wagner |
| 10,086,990 B2 | 10/2018 | Hegami |
| 10,899,496 B2 | 1/2021 | Hengami |
| 11,066,209 B2 | 7/2021 | Hengami |
| 11,111,052 B2 | 9/2021 | Hengami |
| 11,180,281 B2 | 11/2021 | Hengami |
| 11,186,405 B2 * | 11/2021 | Hengami ............. B65D 5/5014 |
| 11,220,369 B2 | 1/2022 | Hengami |
| 11,292,634 B2 | 4/2022 | Hengami |
| 2003/0217944 A1 | 11/2003 | Belloli et al. |
| 2003/0230498 A1 | 12/2003 | Maute |
| 2004/0065723 A1 | 4/2004 | Hengami |
| 2005/0061864 A1 | 3/2005 | Lee |
| 2005/0067476 A1 | 3/2005 | Hengami |
| 2005/0098616 A1 | 5/2005 | Chang |
| 2005/0211754 A1 | 9/2005 | Fulcher |
| 2006/0124709 A1 | 6/2006 | Hengami |
| 2007/0251848 A1 | 11/2007 | Hengami |
| 2007/0261990 A1* | 11/2007 | Weston .................. B65D 5/504 206/488 |
| 2008/0128478 A1 | 6/2008 | Quadrelli |
| 2008/0128480 A1 | 6/2008 | Hegami |
| 2011/0057024 A1 | 3/2011 | Sieber et al. |
| 2011/0062175 A1 | 3/2011 | Nakamura et al. |
| 2011/0111938 A1 | 5/2011 | Smith |
| 2011/0162997 A1 | 7/2011 | Robbins et al. |
| 2011/0168767 A1 | 7/2011 | Hengami |
| 2013/0075462 A1 | 3/2013 | Jones et al. |
| 2015/0321788 A1 | 11/2015 | Hengami |
| 2016/0297589 A1 | 10/2016 | You et al. |
| 2019/0144156 A1 | 5/2019 | Hengami |

FOREIGN PATENT DOCUMENTS

| | | |
|---|---|---|
| EP | 0642977 B1 | 4/1996 |
| EP | 0732269 A1 | 9/1996 |

(56) References Cited

FOREIGN PATENT DOCUMENTS

| | | |
|---|---|---|
| EP | 0761550 A1 | 3/1997 |
| FR | 2799743 | 4/2001 |
| JP | 07223634 | 8/1995 |

OTHER PUBLICATIONS

Http://samanthaleewalker.blogspot.in/2012/12/ornament-box-tutorial.html / Samantha Walker's Imaginary World: Ornamental Box Tutorial; retrieved Aug. 2, 2018; 1 page.
Https://www.pinterest.se/pin/15692298672213867/?lp=true// Corrugated Box with internal insert #packaging; retrieved Aug. 2, 2018; 1 page.
Https://www.pinterest.nz/pin/6848856808218/ / Pinterest; retrieved Aug. 2, 2018; 1 page.
PCT/US2022/34764. International Search Report and Written Opinion dated Oct. 19, 2022.

\* cited by examiner

FOLDING BOX WITH INTEGRAL PRODUCT HOLDER

RELATED APPLICATIONS

This application is a continuation application of U.S. patent application Ser. No. 16/053,766, filed Aug. 2, 2018, entitled "Folding Box with Integral Product Holder, which claims priority to provisional application No. 62/540,507 filed Aug. 2, 2017 entitled "Folding Box With Integral Product Holder," the contents of which are incorporated by reference in their entirety herein.

BACKGROUND

Frequently, heavy but somewhat fragile objects are packaged for storage and transport. Such objects include, for example, auto parts such as alternators or similar parts that may have considerable mass, but also include protruding portions that can easily be damaged. In addition to problems caused by damage to peripheral components, these objects are also difficult to store and ship because movement of such a heavy object held loosely in a cardboard box tends to cause the object to engage the box under inertia, eventually causing damage to the box walls, or causing the box to fail entirely.

One method of avoiding damage during storage and shipping is to provide a filler, which is typically a foam or similar particulate matter filled around the item to be shipped. An ongoing problem with using filler is the difficulty of removing the product from the box without spilling the filler and creating a mess. Attendant issues with fillers can include materials that are not biodegradable or recyclable, and the fact that once discarded, the filler takes up a large amount of room in disposal.

Another type of packaging buffer is a formed insert. Formed inserts are typically made from a vibration dampening material such as styrene, and are usually placed around the exterior edges of a product in a package. Like fillers, inserts effectively shield both the product and the box from damage, but inserts have drawbacks as well. Like fillers, inserts are usually non-biodegradable and non-recyclable, being made of polystyrene. Also, while inserts are tailored to the particular shape of a product, and thus allow space in a box for relatively easy removal of the product from the box, they tend to be large and must be broken up to fit in a disposal container. Furthermore, when broken up, inserts tend to shed small particulates, thus creating a mess as well.

For these reasons, there remains a need for a shipping box that does not require additional packaging components, yet holds the automobile part in place to prevent movement and damage during shipping, is recyclable, and which is comprised of a single biodegradable material.

SUMMARY

An apparatus that satisfies the need for a shipping box is made from a single biodegradable material and holding a heavy object in place during shipment without the need for additional components or filling. The apparatus is a flat pattern blank preferably made from cardboard or paperboard and includes a top panel and a bottom panel, and four side panels extending longitudinally therebetween. All the panels are foldable to each other to form the box for enclosing the heavy object. The single-piece flat pattern blank also includes a single integral holding panel to support the heavy object, foldably connected to the box and folding within the interior of the box upon assembly of the apparatus.

The single integral holding panel includes a plurality of spaced apart cut-outs sized to receive applicable protruding or peripheral components of the heavy object, holding the object in place within the single integral holding panel. The cut-outs may include a foldably connected tab for further supporting the heavy object inside the box. The single integral holding panel further includes a plurality of spaced apart tabs foldable against the side panels of the box to support the position of the single integral holding panel between the side panels when folded inside the box. The single integral holding panel may foldably connect to a side panel of the box and/or includes opposing generally triangular-shaped holding panels foldably connected to each other. The single integral holding panel may further include an inner panel between one of the side panels of the box and the generally triangular-shaped holding panels, serving as an extension of the single integral holding panel into the box.

DESCRIPTION

Figure 1:
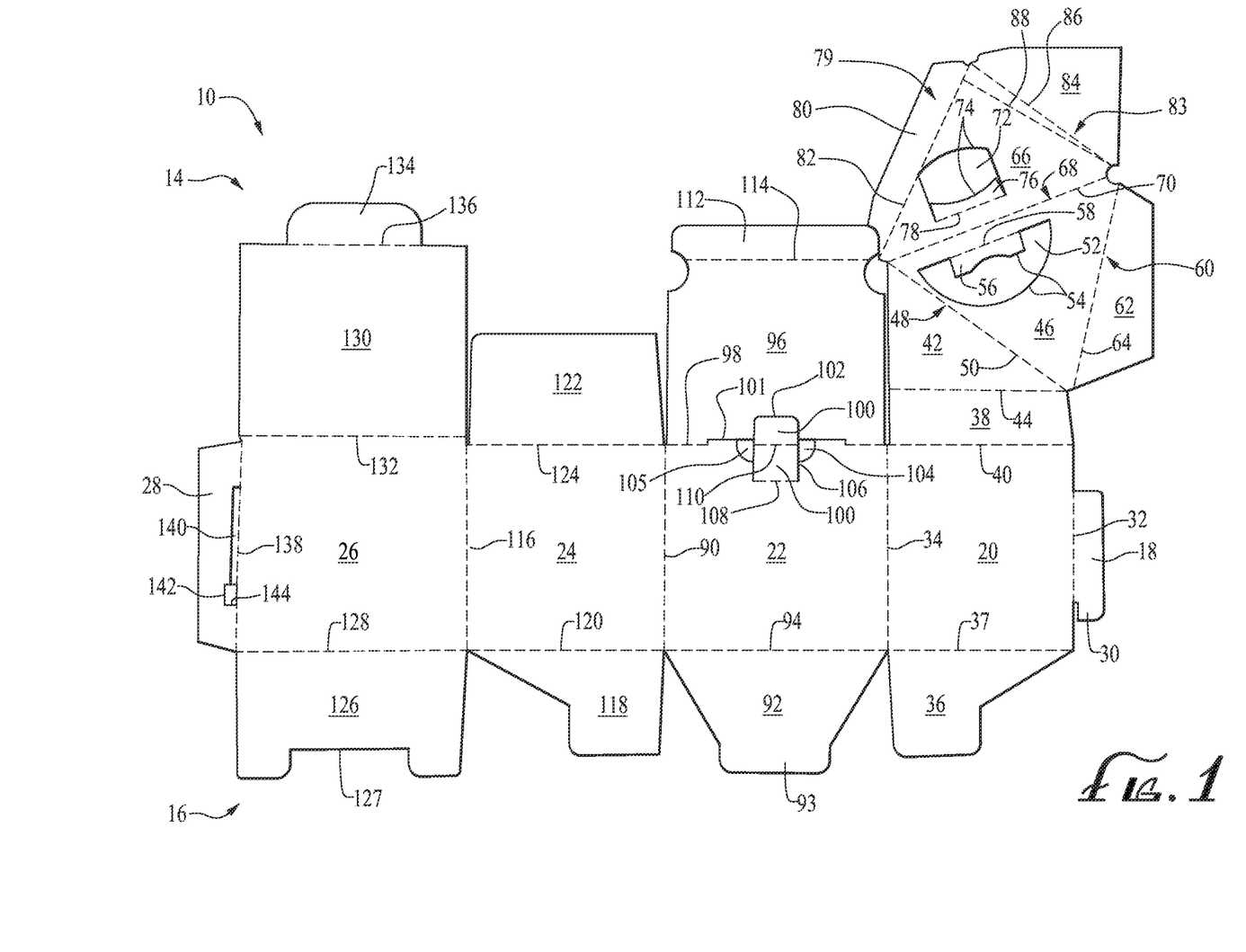
FIG. 1 illustrates a flat pattern view of a single cardboard blank from which an embodiment of the box is made.

FIG. 1 illustrates a cardboard blank 10 that may be folded to form a box 12 (FIGS. 2-6) for holding heavy objects such as an automobile alternator or other automobile part for storage and/or shipping. The blank 10 has a top end 14 and a bottom end 16 and is scored or otherwise adapted for folding in a predetermined manner. The principal folding portions of the blank 10 include first inner tab 18 and second inner tab 28, and first panel 20, second panel 22, third panel 24, and fourth panel 26 all connected together and extending longitudinally or lengthwise along the longer side.

Still referring to FIG. 1, the first inner tab 18 includes a locking notch 30 and is connected to the first panel 20 along first inner tab fold line 32. First panel 20 is connected to second panel 22 by first fold line 34. The bottom end 16 of first panel 20 includes first bottom tab 36 connected to first panel 20 along first bottom tab fold line 37. The top end 14 of first panel 20 is foldably coupled to a folding support structure along first inner flap fold line 40. The folding support structure includes first inner flap 38 connected to first panel 20 along first inner flap fold line 40, a second inner flap 42 which is connected to first inner flap 38 along first inner flap second fold line 44, a first integral holding panel 46 which is connected to second inner flap 42 along first edge fold line 50, and a second integral holding panel 66 which is foldably connected to the first integral holding panel 46 along second integral holding panel fold line 70.

First integral holding panel 46 is preferably triangular in shape having first integral holding panel first edge 48, first integral holding panel second edge 60, and first integral holding panel third edge 68. Alternatively, first integral holding panel 46 may be square, rectangular, semi-circular or other shapes. The first integral holding panel 46 includes a first cutout 52 defined about first cut line 54. A first integral holding panel flap 56 is foldably connected to first cutout 52 along first integral holding panel flap fold line 58. Third inner tab 62 is foldably connected to first integral holding panel 46 along third inner tab fold line 64. Second integral holding panel 66 is foldably connected to first integral holding panel 46 along second integral holding panel fold line 70 and is a preferably triangularly shaped. Second integral holding panel 66 is defined by first integral holding panel third edge 68, second integral holding panel second edge 79, and second integral holding panel third edge 83.

The second integral holding panel 66 includes a second cutout 72 defined about second cut line 74. Second cutout 72 includes second integral holding panel flap 76 foldably connected to second integral holding panel 66 along second integral holding panel flap fold line 78. Fourth inner tab 80 is foldably connected to second integral holding panel 66 by fourth inner tab fold line 82 and fifth inner tab 84 is foldably connected to second integral holding panel 66 along fifth inner tab fold line 86. A second integral holding panel interior fold line 88 runs alongside the fifth inner tab fold line 86 and perpendicular to a segment of the fourth inner tab fold line 82, preferably forming an isosceles triangle between the three fold lines.

Still referring to FIG. 1, second panel 22 is foldably connected to third panel 24 along third fold line 90. Second panel 22 includes second bottom tab 92 foldably connected along second bottom tab fold line 94 and first lid 96 connected along first lid fold line 98. Second bottom tab 92 includes an appendage 93. The length of first lid fold line 98 is interrupted by closure tab 100 adjacent the top end 14 of the second panel 22. A third cut line 101 extends perpendicular to each side of the closure tab 100. The closure tab 100 is defined about closure tab cut line 102 and includes closure tab first fold line 108 and closure tab second fold line 110. A sixth inner tab 112 is foldably connected to the first lid 96 along a sixth inner tab fold line 114.

Third panel 24 is connected to fourth panel 26 along a fourth fold line 116. Third panel 24 includes third bottom tab 118 connected along third bottom tab fold line 120 and top flap 122 connected along top flap fold line 124. The fourth panel 26 includes fourth bottom tab 126 connected along fourth bottom tab fold line 128, second lid 130 connected along the second lid fold line 132 and second inner tab 28 connected along second inner tab fold line 138. The second lid 130 includes sixth inner tab 134 connected along sixth inner tab fold line 136. The second inner tab 28 includes second inner tab first cut out 140 and second inner tab second cut out 142 both defined by second inner tab cut line 144. Second inner tab second cut out 142 forms a catch such that the locking notch 30 from first inner tab 18 remains in place and exterior to the box 12 after the first inner tab 18 is inserted into the second inner tab first cut out 140.

Figure 2:
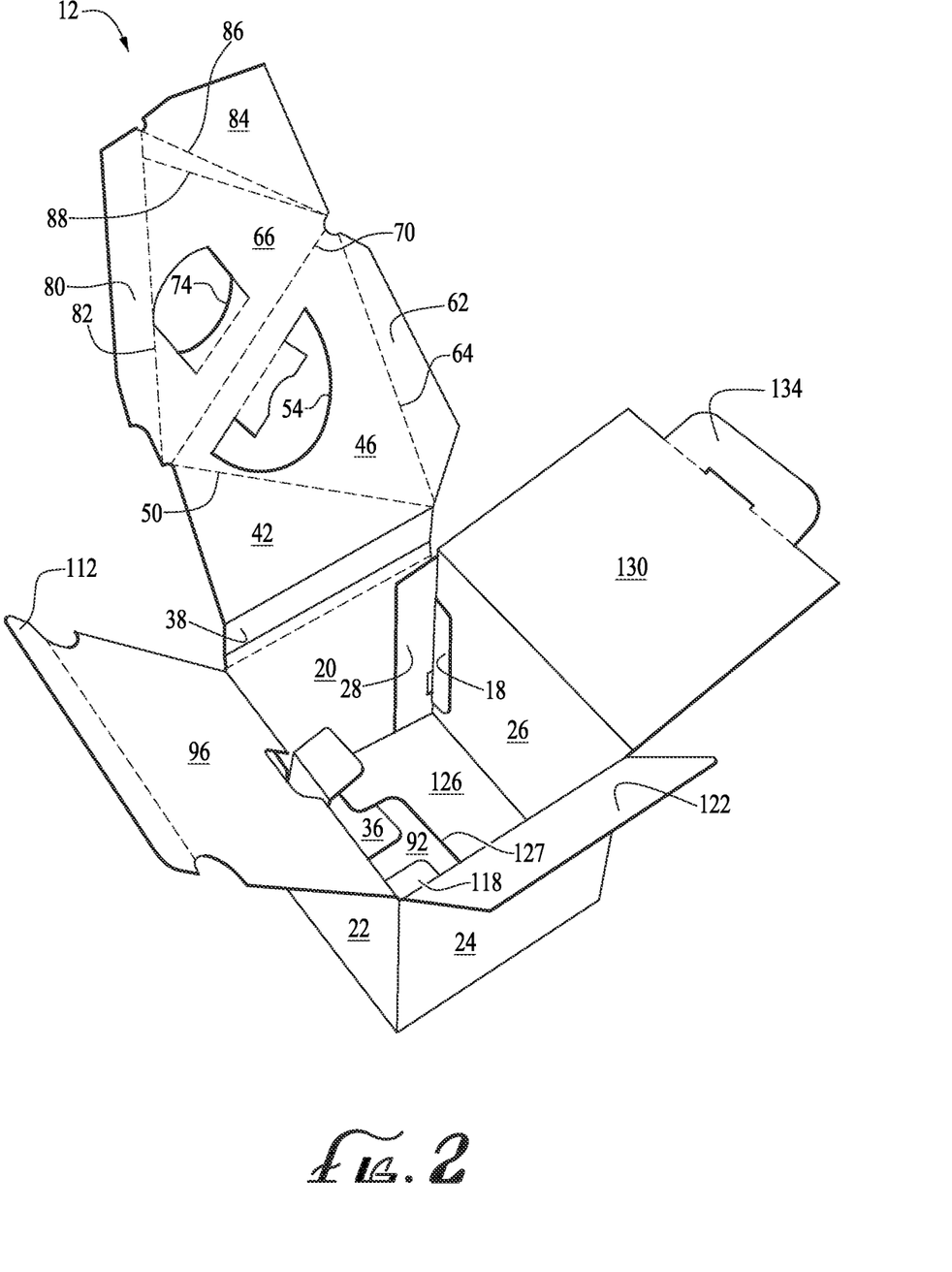
FIG. 2 illustrates a top perspective view of the single cardboard blank showing partial assembly of the box.

Referring now to FIG. 2, the box 12 is shown in partial assembly. First panel 20, second panel 22, third panel 24. and fourth panel 26 have been folded substantially at right angles to one another. Second inner tab 28 from fourth panel 26 is folded and placed in the interior of the box 12. First inner tab 18 is folded substantially at a right angle from first panel 20 and is inserted into second inner tab first cut out 140. Locking notch 30 is placed in second inner tab second cut out 142. The box 12 is closed at bottom end 16 preferably by folding fourth bottom tab 126 inward followed by third bottom tab 118 and first bottom tab 36. Second bottom tab 92 is preferably folded over third bottom tab 118 and first bottom tab 36, and second bottom tab appendage 93 is inserted into fourth bottom tab receiving end 127.

Figure 3:
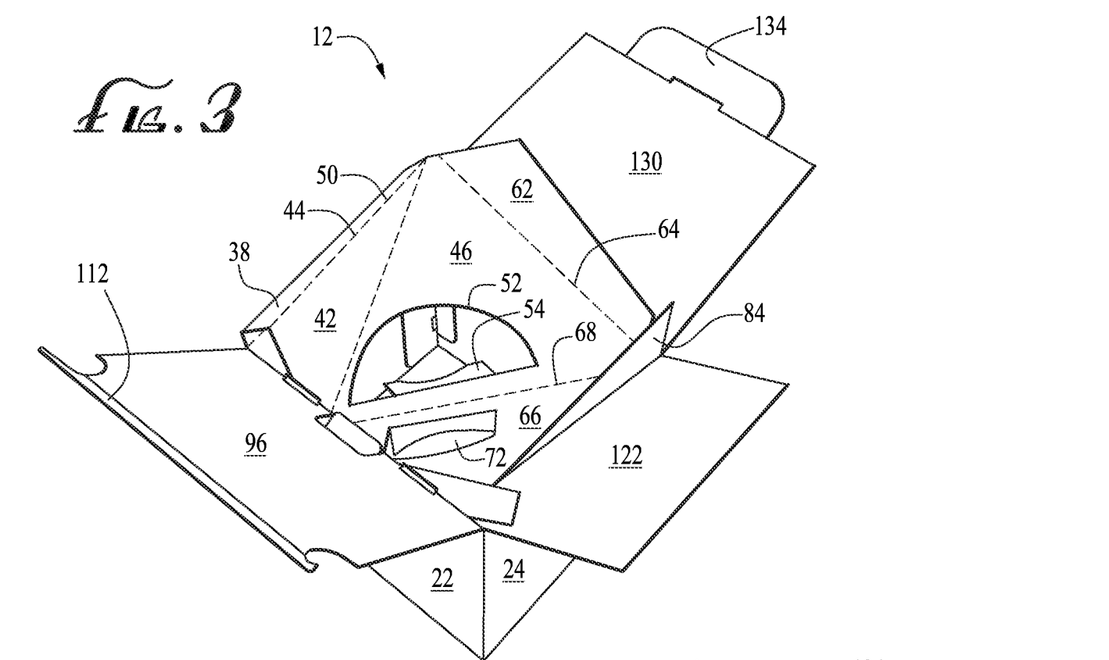
FIG. 3 illustrates a perspective view of the initial assembly stage of an integral holding panel folding and inserting within the box.
Figure 4:
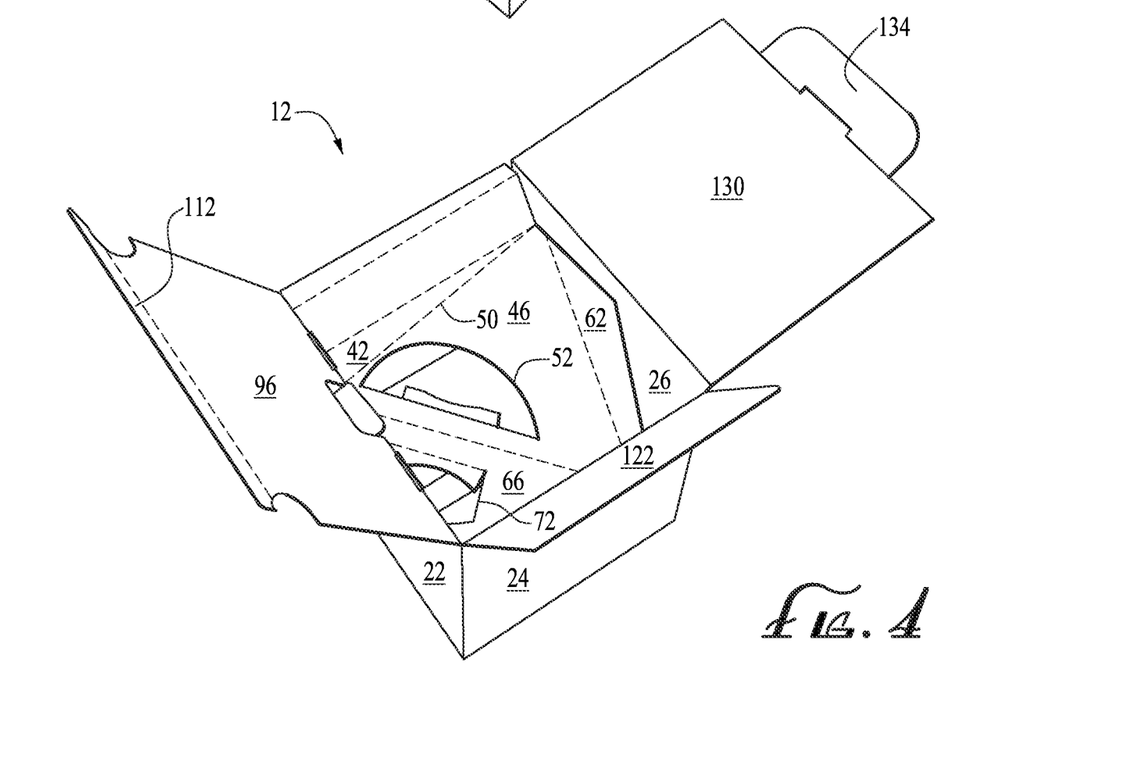
FIG. 4 illustrates a perspective view of the box and integral holding panel folded and inserted within the box and ready for holding a heavy object.

Referring to FIGS. 3 and 4, to complete assembly, first inner flap 38 is folded substantially at a right angle from first panel 20 (not shown). The second inner flap 42 is folded towards the interior of the box 12. First integral holding panel 46 and second integral holding panel 66 are folded at the second integral holding panel fold line 70 such that the first integral holding panel 46 and second integral holding panel 66 are substantially at a right angle from each other. Third inner tab 62 is folded and inserted into the box 12 adjacent fourth panel 26 (not shown), fourth inner tab 80 (not shown) is folded and inserted into the box 12 adjacent second panel 22, and fifth inner tab 84 (not shown) is folded and inserted into the box 12 adjacent third panel 24.

Figure 5:
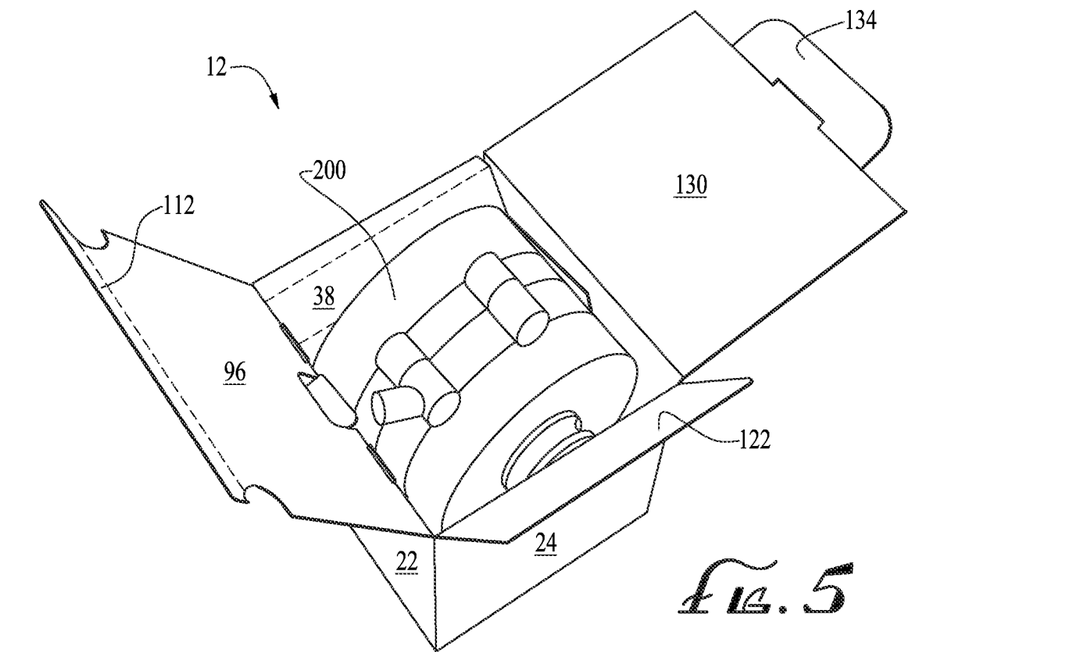
FIG. 5 illustrates a perspective view of the box holding an alternator or similar heavy auto part.
Figure 6:
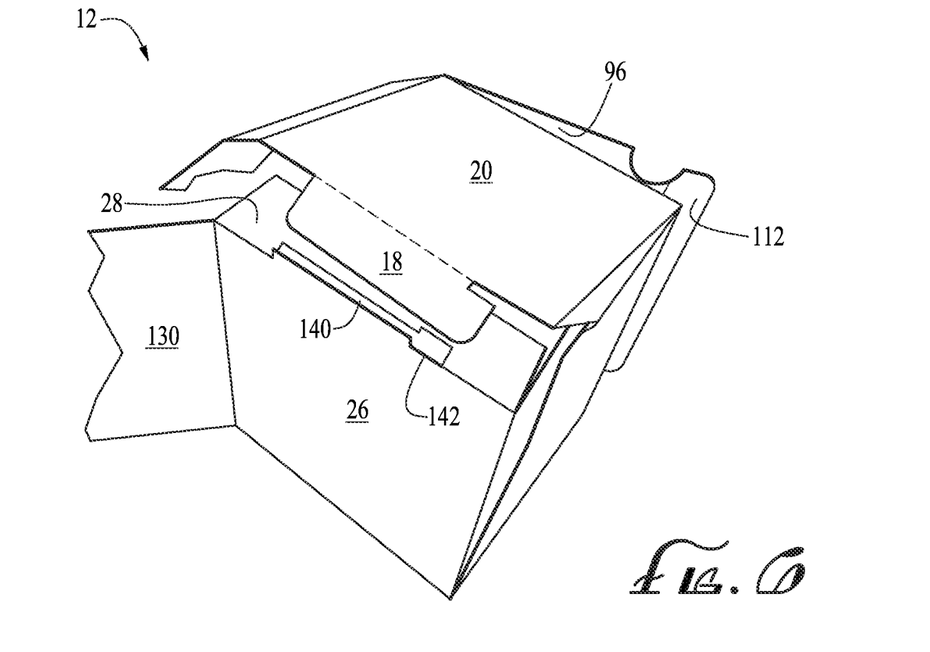
FIG. 6 illustrates disassembly of the box from around the heavy object without having to lift the object from the top of the box.

Referring to FIGS. 5 and 6, after the box 12 is formed, an alternator 200 as shown in the illustrated embodiment, or similar, typically heavy automobile component is placed in the box 12, where it is supported by first integral holding panel 46 and second integral holding panel 66, with portions of the alternator 200 supported in the first cutout 52 and the second cutout 72. In this manner, protruding portions of the alternator 200 can take up room inside the box 12, yet are prevented from puncturing the first panel 20, second panel 22, third panel 24 or fourth panel 26 by being supported by the first cutout 52 and second cutout 72.

The top of the box 12 is preferably assembled by first folding top flap 122 inward. Sixth inner tab 112 of first lid 96 is folded substantially at a right angle such that when first lid 96 is folded inward, sixth inner tab 112 slides behind second inner tab 28 and rests adjacent fourth panel 26. The closure tab 100 is folded away from the box 20. Second lid flap 134 is folded substantially at a right angle from second lid 30 so that second lid flap 134 may insert into the box 12 at the third cut line 101. Upon insertion of the second lid flap 134, the closure tab second fold line 110 is folded substantially at a right angle such that a segment of the closure tab 100 rests atop the second lid, securing the box 12 in a closed position.

Referring specifically to FIG. 6, in the event a large or heavy part is contained in the box 12, the box 12 can be disassembled and unwrapped from around the part without lifting the part. To accomplish disassembly, the top of the box 12 is opened by unfolding first lid 96, top flap 122 and second lid 130. Thereafter, first inner tab 18 is disengaged from second inner tab first cutout 140 and second inner tab second cutout 142 by lifting locking notch 30 free of second inner tab second cutout 142. Once disconnected, first panel 20 can be pulled away from fourth panel 26, thus allowing egress to the interior of the box.

While particular forms of the invention have been illustrated and described, it will also be apparent to those skilled in the art that various modifications can be made without departing from the spirit and scope of the invention. Accordingly, it is not intended that the invention be limited except by the appended claims.

Insofar as the description above and the accompanying drawing disclose any additional subject matter that is not within the scope of the single claim below, the inventions are not dedicated to the public and the right to file one or more applications to claim such additional inventions is reserved.

What is claimed is:

1. A blank for making a box, the blank comprising:
   a) a first inner tab;
   b) a first panel having a top end and a bottom end and being foldably connected to the first inner tab by a first inner tab fold line and a folding support structure configured for inserting inside the box, the folding support structure comprising:
      i) a first inner flap which is connected to the first panel along a first inner flap fold line;
      ii) a second inner flap which is connected to the first inner flap along a first inner flap second fold line;
      iii) a triangular shaped first integral holding panel which is connected to the second inner flap along a first edge fold line; and
      iv) a triangular shaped second integral holding panel which is foldably connected to the first integral holding panel along a second integral holding panel fold line;
   c) a second panel having a top end and a bottom end and being foldably connected to the first panel by a first fold line;
   d) a third panel having a top end and a bottom end and being foldably connected to the second panel by a third fold line;
   e) a fourth panel having a top end and a bottom end and being foldably connected to the third panel by a fourth fold line; and
   f) a second inner tab foldably connected to the fourth panel by second inner tab fold line;
   wherein the first, second, third and fourth panels form sidewalls of the box when the blank is folded.

2. The blank of claim 1, wherein the bottom end of the first panel comprises a first bottom tab connected to the first panel along a first bottom tab fold line.

3. The blank of claim 1, wherein the second panel comprises a second bottom tab foldably connected to the second panel along a second bottom tab fold line and a first lid connected to the second panel along a first lid fold line.

4. The blank of claim 3, wherein the second bottom tab comprises an appendage.

5. The blank of claim 4, wherein a length of first lid fold line is interrupted by a closure tab adjacent the top end of the second panel.

6. The blank of claim 3, wherein a sixth inner tab is foldably connected to the first lid along a sixth inner tab fold line.

7. The blank of claim 1, wherein the third panel comprises a third bottom tab connected to the third panel along a third bottom tab fold line and a top flap is connected to the third panel along a top flap fold line.

8. The blank of claim 1, wherein the fourth panel comprises a fourth bottom tab connected to the fourth panel along a fourth bottom tab fold line, a second lid is connected to the fourth panel along a second lid fold line and a second inner tab is connected to the fourth panel along a second inner tab fold line.

9. The blank of claim 8, wherein the second lid comprises a sixth inner tab connected to the second lid along a sixth inner tab fold line.

10. A single blank for forming a box, the blank comprising:
    a) a first panel having a top end and a bottom end and being foldably connected to a folding support structure that is foldable and insertable inside the box, the folding support structure comprising:
       i) a first inner flap which is connected to the first panel along a first inner flap fold line;
       ii) a second inner flap which is connected to the first inner flap along a first inner flap second fold line;
       iii) a first integral holding panel which is connected to the second inner flap along a first edge fold line; and
       iv) a second integral holding panel which is foldably connected to the first integral holding panel along a second integral holding panel fold line;
    b) a second panel having a top end and a bottom end and being foldably connected to the first panel by a first fold line;
    c) a third panel having a top end and a bottom end and being foldably connected to the second panel by a third fold line; and
    d) a fourth panel having a top end and a bottom end and being foldably connected to the third panel by a fourth fold line, wherein the first and second integral holding panels are triangular shaped and each have at least one cut-out sized to receive an object.

11. A single blank for forming a box, the blank comprising:
    a) a first panel having a top end and a bottom end and being foldably connected to a folding support structure that is foldable and insertable inside the box, the folding support structure comprising:
       i) a first inner flap which is connected to the first panel along a first inner flap fold line;
       ii) a second inner flap which is connected to the first inner flap along a first inner flap second fold line;
       iii) a first integral holding panel which is connected to the second inner flap along a first edge fold line; and
       iv) a second integral holding panel which is foldably connected to the first integral holding panel along a second integral holding panel fold line;
    b) a second panel having a top end and a bottom end and being foldably connected to the first panel by a first fold line;
    c) a third panel having a top end and a bottom end and being foldably connected to the second panel by a third fold line; and
    d) a fourth panel having a top end and a bottom end and being foldably connected to the third panel by a fourth fold line, wherein the bottom end of the first panel comprises a first bottom tab connected to the first panel along a first bottom tab fold line.

12. A single blank for forming a box, the blank comprising:
    a) a first panel having a top end and a bottom end and being foldably connected to a folding support structure that is foldable and insertable inside the box, the folding support structure comprising:
       i) a first inner flap which is connected to the first panel along a first inner flap fold line;
       ii) a second inner flap which is connected to the first inner flap along a first inner flap second fold line;
       iii) a first integral holding panel which is connected to the second inner flap along a first edge fold line; and
       iv) a second integral holding panel which is foldably connected to the first integral holding panel along a second integral holding panel fold line;
    b) a second panel having a top end and a bottom end and being foldably connected to the first panel by a first fold line;
    c) a third panel having a top end and a bottom end and being foldably connected to the second panel by a third fold line; and d) a fourth panel having a top end and a bottom end and being foldably connected to the third panel by a fourth fold line, wherein the second panel comprises a second bottom tab foldably connected to the second panel along a second bottom tab fold line and a first lid is connected to the second panel along a first lid fold line, wherein the second bottom tab comprises an appendage, wherein a length of the first lid fold line is interrupted by a closure tab adjacent the top end of the second panel.

13. A single blank for forming a box, the blank comprising:
a) a first panel having a top end and a bottom end and being foldably connected to a folding support structure that is foldable and insertable inside the box, the folding support structure comprising:
  i) a first inner flap which is connected to the first panel along a first inner flap fold line;
  ii) a second inner flap which is connected to the first inner flap along a first inner flap second fold line;
  iii) a first integral holding panel which is connected to the second inner flap along a first edge fold line; and
  iv) a second integral holding panel which is foldably connected to the first integral holding panel along a second integral holding panel fold line;
b) a second panel having a top end and a bottom end and being foldably connected to the first panel by a first fold line;
c) a third panel having a top end and a bottom end and being foldably connected to the second panel by a third fold line; and
d) a fourth panel having a top end and a bottom end and being foldably connected to the third panel by a fourth fold line, wherein the second panel comprises a second bottom tab foldably connected to the second panel along a second bottom tab fold line and a first lid is connected to the second panel along a first lid fold line, wherein a sixth inner tab is foldably connected to the first lid along a sixth inner tab fold line.

14. A single blank for forming a box, the blank comprising:
a) a first panel having a top end and a bottom end and being foldably connected to a folding support structure that is foldable and insertable inside the box, the folding support structure comprising:
  i) a first inner flap which is connected to the first panel along a first inner flap fold line;
  ii) a second inner flap which is connected to the first inner flap along a first inner flap second fold line;
  iii) a first integral holding panel which is connected to the second inner flap along a first edge fold line; and
  iv) a second integral holding panel which is foldably connected to the first integral holding panel along a second integral holding panel fold line;
b) a second panel having a top end and a bottom end and being foldably connected to the first panel by a first fold line;
c) a third panel having a top end and a bottom end and being foldably connected to the second panel by a third fold line; and
d) a fourth panel having a top end and a bottom end and being foldably connected to the third panel by a fourth fold line, wherein the fourth panel comprises a fourth bottom tab connected to the fourth panel along a fourth bottom tab fold line, a second lid connected to the fourth panel along a second lid fold line and a second inner tab connected to the fourth panel along a second inner tab fold line.

15. The blank of claim 14, wherein the second lid comprises a sixth inner tab connected to the second lid along a sixth inner tab fold line.

* * * * *